(12) United States Patent
Wu

(10) Patent No.: US 8,265,040 B2
(45) Date of Patent: Sep. 11, 2012

(54) METHOD OF ENCODING GROUP IDENTIFICATION IN A CDMA TRUNKING SYSTEM

(75) Inventor: Chuanxi Wu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 302 days.

(21) Appl. No.: 12/747,563

(22) PCT Filed: Dec. 12, 2008

(86) PCT No.: PCT/CN2008/073498
§ 371 (c)(1),
(2), (4) Date: Jun. 11, 2010

(87) PCT Pub. No.: WO2009/082916
PCT Pub. Date: Jul. 9, 2009

(65) Prior Publication Data
US 2010/0260149 A1 Oct. 14, 2010

(30) Foreign Application Priority Data
Dec. 17, 2007 (CN) .......................... 2007 1 0198492

(51) Int. Cl.
*H04B 7/216* (2006.01)

(52) U.S. Cl. ........................................................ 370/335

(58) Field of Classification Search .................. 370/320, 370/335, 342, 349, 441
See application file for complete search history.

(56) References Cited

U.S. PATENT DOCUMENTS

| | | | |
|---|---|---|---|
| 6,519,239 B1 | 2/2003 | Panchal et al. | |
| 2007/0003048 A1* | 1/2007 | Starling et al. | 379/219 |

FOREIGN PATENT DOCUMENTS

| | | |
|---|---|---|
| CN | 1391736 A | 1/2003 |
| CN | 1810050 A | 7/2006 |
| EP | 1639841 A1 | 3/2006 |

OTHER PUBLICATIONS

International Search Report in international application No. PCT/CN2008/073498, mailed on Mar. 19, 2009.
English Translation of the Written Opinion of the International Search Authority in international application No. PCT/CN2008/073498, mailed on Mar. 19, 2009.

* cited by examiner

*Primary Examiner* — Anh-Vu Ly
*Assistant Examiner* — Mang Yeung
(74) *Attorney, Agent, or Firm* — Schiff Hardin LLP

(57) ABSTRACT

The present invention discloses a method of encoding group identification in a CDMA trunking system. This method comprises: a trunking group where mobile stations locate is encoded by a preset GID encoding method to generate a GID of the trunking group. The GID is a character string consisting of a plurality of decimal digits from 0 to 9 for external processing, and is processed into a binary character string according to a GID type for internal processing.

12 Claims, 3 Drawing Sheets

| TYPE | MCC | MNC | MIN | PHR | User code |
|------|-----|-----|-----|-----|-----------|
| | | | | | |

Fig. 1

| TYPE | MCC | MNC | MIN | PHR | User code |
|------|-----|-----|-----|-----|-----------|
|      |     |     |     |     |           |

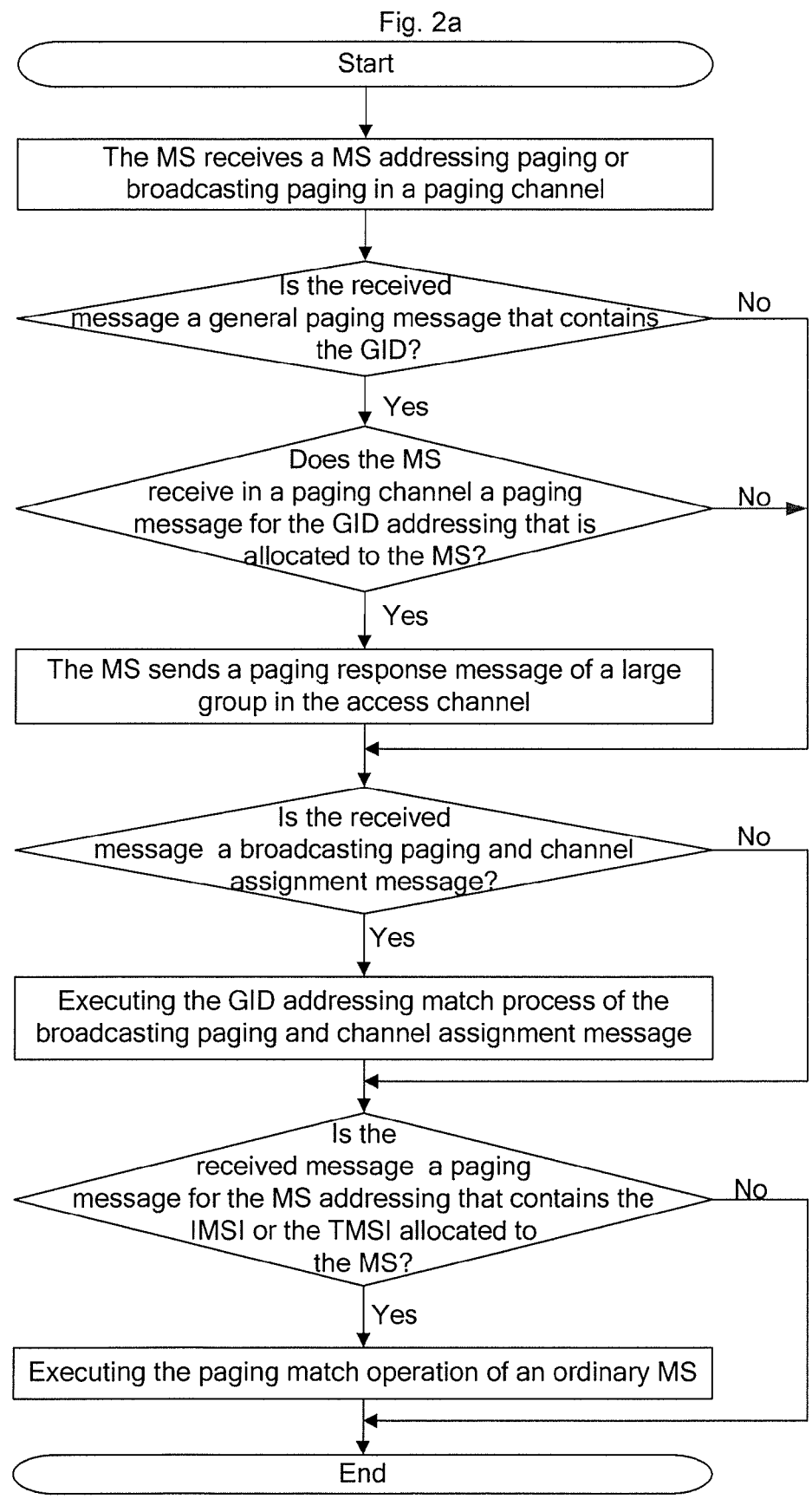

METHOD OF ENCODING GROUP IDENTIFICATION IN A CDMA TRUNKING SYSTEM

TECHNICAL FIELD

The present invention relates to the technology for identifying different trunking groups in a Code Division Multiple Access (CDMA) trunking, particularly to a method of encoding group identification (GID or Gid) in a CDMA trunking system.

BACKGROUND

A trunking communication system emerged in late 1970s and early 1980s. The earliest trunking communication is a simulation system. Digital trunking technology realized worldwide presence in 1990s. In late 1990s, digital trunking network appeared in China. The trunking communication service may include a plurality of users one time. These users are allocated to different groups according to their belongingness and one group is called a trunking group. One of the most prominent features of trunking communication is a massive call or group call. The group call function of trunking service refers to that: calling a group number at a communication terminal or a dispatcher station may bring all terminals in the group into a call, thereby realizing the effect of multi-person concurrent call.

The trunking communication system conventionally uses a group call ID to identify a trunking group. A group call ID uniquely identifies a trunking group, and typically may consist of a Group Identification (GID or Gid) (or called group identity) alone or as well as other attributes like group call area. Wherein, the GID identifies the terminals in the trunking group. All terminals in this trunking group have the GID defined by this trunking group. The trunking group stores its GID in a data memory device at the system side and in terminals, and uses the GID to determine the trunking group where this terminal is located during an authentication. One terminal may subscribe a plurality of trunking groups in the same time. The group call area refers to the area in which this trunking group may call when the group call of the trunking group is a voice group call service. Only the terminals which are located in this area and are members of this trunking group are available to the call service. As the GID is used to identify the trunking group to which the terminals belong, different trunking groups have different GIDs. However, the GID resources are limited. For example, if a GID number has three digits, 1000 trunking groups can be identified; if a GID number has four digits, 10000 trunking groups can be identified. With the continuous expansion of trunking networks, this GID encoding method is far from enough for the trunking communication system in a whole communication network. Moreover, to adapt to the development of the trunking communication system by using this GID encoding method and increasing digits of the GID will cause inconvenience in management.

SUMMARY

The present invention is introduced to address the problem that the GID encoding method in related art is inapplicable to the developing CDMA trunking system and not easily managed. The main object of the present invention is to provide a modified solution of encoding group identification in the CDMA trunking system and use the solution to solve at least one of the foregoing problems in related art.

According to one aspect of the present invention, a method of encoding group identification in the CDMA trunking system is provided.

A method of encoding group identification in the CDMA trunking system of the present invention, comprises: a trunking group where mobile stations locate is encoded by a preset GID encoding method to generate a GID of the trunking group; the GID is a character string consisting of a plurality of decimal digits from 0 to 9 for external processing, and is processed into a binary character string according to a GID type for internal processing.

Preferably, when the GID is used for external processing, it is manifested in a form of a character string consisting of a 16-digit decimal number.

Preferably, when GID is used for internal processing, it is manifested in a form of a character string consisting of a 28-bit or 52-bit binary number.

Preferably, the GID may comprise: a type identity (TYPE), in the initial place of GID, one digit, for identifying GID type; a Mobile Country Code (MCC), behind the TYPE, 3 digits, for identifying the country where a mobile station (MS) is located; a Mobile Network Code (MNC), behind the MCC, 2 digits, for identifying the mobile network; a Mobile Identification Number (MIN), behind the MNC, 2 digits, as a mobile identification number segment allocated to each country; a Push to Talk (PTT) Home Register (PHR), behind the MIN, 3 digits, allocated to local network by an operator in a unified way; and a user code, behind the PHR, 5 digits, as a sole identification number allocated by the PTT home register.

Preferably, the types of the GIDs may include solid type and dynamic type.

Preferably, the encoding method provided by the present invention may also comprise: the GID type is determined according to the TYPE; if the GID type is solid type, the GID will be processed into a 28-bit binary GID; if the GID type is dynamic type, the GID will be processed into a 52-bit binary GID.

Preferably, the 28-bit binary GID may comprise: the TYPE, one bit; and a 27-bit binary number obtained by encoding the PHR and the user code.

Preferably, the 52-bit binary GID may comprise: the TYPE, one bit; a 10-bit binary MCC obtained by encoding the MCC; a 7-bit binary MNC obtained by encoding the MNC; a 7-bit binary MIN obtained by encoding the MIN; and a 27-bit binary number obtained by encoding the PHR and the user code.

Preferably, the 27-bit binary number obtained by encoding the PHR and the user code may comprise: a 10-bit binary number obtained by encoding the PHR, which takes up the first 10 bits of the 27-bit binary number; a 7-bit binary number obtained by encoding the first two digits of the user code, which takes up the 7 bits in the middle of the 27-bit binary number; and a 10-bit binary number obtained by encoding the last three digits of the user code, which takes up the last 10 bits of the 27-bit binary number.

Preferably, the process of encoding the PHR and the last three digits of the user code specifically include: D1, D2 and D3 are used to represent a 3-digit decimal number and if any of D1, D2 and D3 is 0, then 0 will be replaced with 10 as any of D1, D2 and D3; 100×D1+10×D2+D3−111; and the calculation result is converted into a 10-bit binary number according to the decimal-to-binary conversion table.

Preferably, the process of encoding the first two digits of the user code to obtain a 7-bit binary number specifically includes: D1 and D2 are used to represent a 2-digit decimal number, and if any of D1 and D2 is 0, then 0 will be replaced with 10 as any of D1 and D2; 10×D1+D2−11; the calculation result is converted into a 10-bit binary number according to the decimal-to-binary conversion table; and the last 7 bits of the obtained 10-bit binary number is chosen as a result.

By relying on the technical solution provided by the present invention, the GID encoding method is redefined and then the GID is encoded by the defined encoding method. This approach can make full use of the characteristics of different network segments and may guarantee the uniqueness and completeness of the GIDs, thereby solving the problem that the GID encoding method in related art is inapplicable to the developing CDMA trunking system and not easily managed, and further enabling an efficient group call and paging process.

Other characteristics and advantages of the present invention will be illustrated in the subsequent Description, or partially become obvious through the description or understood through implementation of the present invention. The object and other advantages of the present invention may be realized and acquired through the structures particularly indicated in the Description, Claims and Drawings.

BRIEF DESCRIPTION OF THE DRAWINGS

The drawings are intended to provide further understanding on the present invention and constitute a part of the Description. They are intended to explain the present invention in connection with the embodiments of the present invention and not to limit the present invention. Among the drawings:

FIG. 1 is a schematic diagram of the method of encoding group identification in a CDMA trunking system according to the present invention;

FIG. 2a is a flow chart showing an MS conducts a paging match process by the encoding method provided by the present invention, and receives a MS addressing paging or broadcasting paging.

DETAILED DESCRIPTION

Function Summary

Figure 2B:
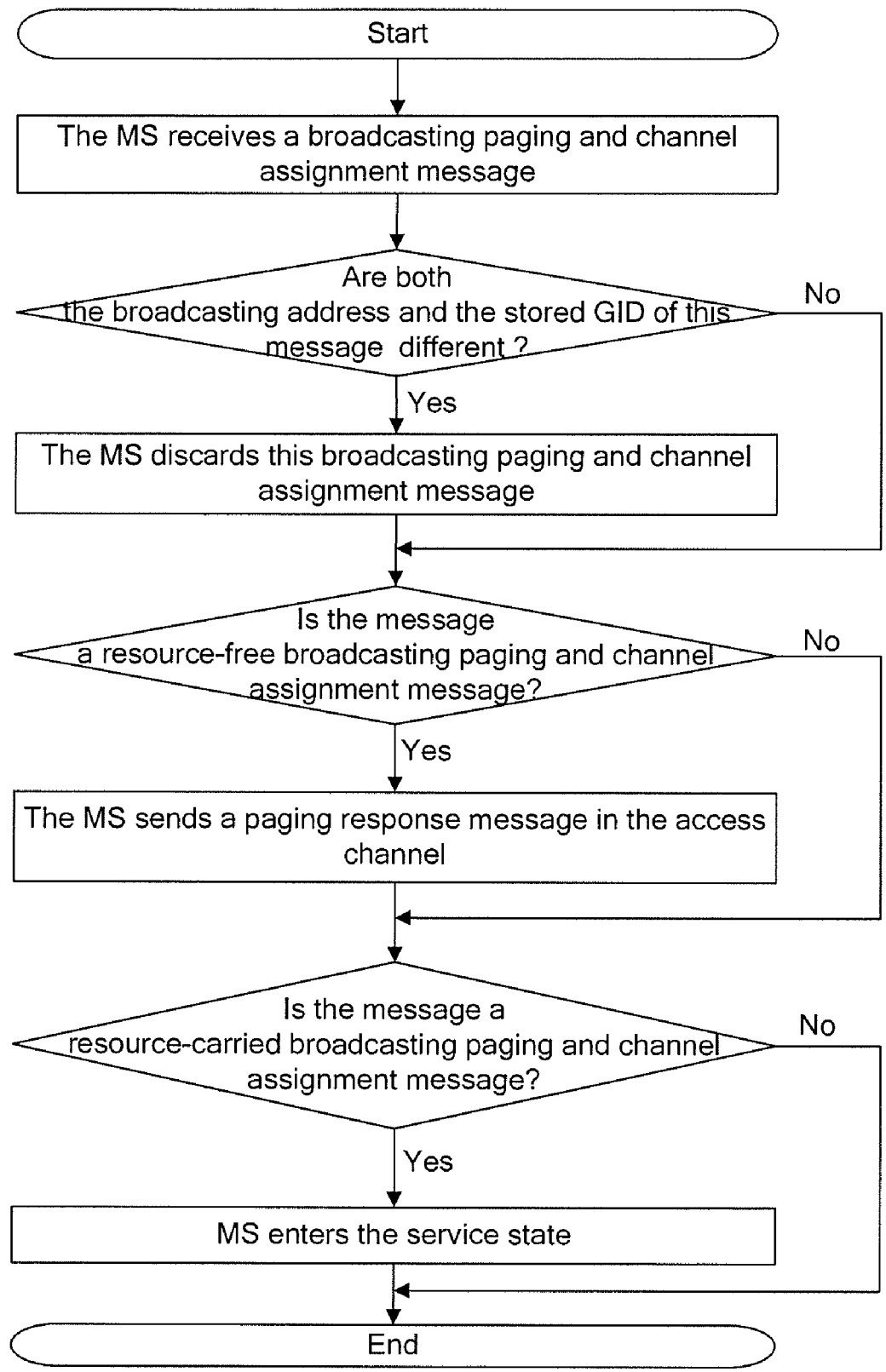
FIG. 2b is a flow chart showing an MS conducts a paging match process by the encoding method provided by the present invention, and wherein the mobile station receives a broadcasting paging and channel assignment message.

To address the problem that the GID encoding method in related art is inapplicable to the developing CDMA trunking system and not easily managed, the embodiments of the present invention provide a modified solution of encoding group identification in the CDMA trunking system. In the solution provided by the embodiments of the present invention, firstly the GID encoding method is redefined and then the GID is encoded by the defined encoding method. This approach can make full use of the characteristics of different network segments and may guarantee the uniqueness and soundness of the GIDs.

The preferred embodiments of the present invention are described below in connection with drawings. It should be understood that the preferred embodiments described here are intended to illustrate and not to limit the present invention. It should be noted that if without conflict, the embodiments of the present invention and the characteristics in the embodiments may be combined.

The embodiment of the present invention provides a method of encoding group identification in a CDMA trunking system. It should be noted that this method may be executed in a computer system such as: a group of commands executable by computer.

In the following embodiments, if there is no special declaration, the referred group identification (GID or Gid) is also called as a group identifier, or a group sign, or a group identity, or a group identification code.

The embodiment of the method of encoding group identification in a CDMA trunking system provided by the present invention comprises: a trunking group where mobile stations locate is encoded by a preset GID encoding method to generate a GID of the trunking group. The GID is a character string consisting of a plurality of decimal digits from 0 to 9 for external processing, and is processed into a binary character string according to a GID type for internal processing.

In the method, when the GID is used for external processing, it is manifested in a form of a character string consisting of a 16-digit decimal number; and when the GID is used for internal processing, it is manifested in a form of a character string consisting of a 28-bit or 52-bit binary number.

The GID may comprise: a type identity (TYPE), in the initial place of the GID, one digit, for identifying GID type; a mobile country code (MCC), behind the TYPE, 3 digits, for identifying the country where the MS is located; a mobile network code (MNC), behind the MCC, 2 digits, for identifying the mobile network; a mobile identification number (MIN), behind the MNC, 2 digits, as a mobile identification number segment allocated to each country; a Push to Talk (PTT) home register (PHR), behind the MIN, 3 digits, allocated to local network by an operator in a unified way; and a user code, behind the PHR, 5 digits, as the sole identification number allocated by the PTT home register.

Further, GID types may include solid type and dynamic type.

The encoding method provided by the embodiment of the present invention may further comprise: the GID type is determined according to the TYPE, or in other words, the TYPE expresses the GID type. That is to say, if the TYPE in the GID is a solid type, the GID will be a 28-bit binary GID; if the TYPE in the GID is a dynamic type, the GID will be a 52-bit binary GID. Specifically, the 28-bit binary GID may comprise: the TYPE, one bit; and a 27-bit binary number obtained by encoding the PHR and the user code. The 52-bit binary GID may comprise: the TYPE, one bit; a 10-bit binary MCC obtained by encoding the MCC; a 7-bit binary MNC obtained by encoding the MNC; a 7-bit binary MIN obtained by encoding the MIN; and a 27-bit binary number obtained by encoding the PHR and the user code.

Specifically, the operation of encoding the PHR and the user code to obtain a 27-bit binary number may comprise: encoding the PHR to obtain a 10-bit binary number as the first 10 bits of the 27-bit binary number; encoding the first two digits of the user code to obtain a 7-bit binary number as the 7 bits in the middle of the 27-bit binary number; and encoding the last three digits of the user code to obtain a 10-bit binary number as the last 10 bits of the 27-bit binary number.

Specifically, the operation of encoding the first two digits of the user code to obtain a 7-bit binary number specifically includes: D1 and D2 represent a 2-digit decimal number, and if any of D1 and D2 is 0, then 0 will be replaced with 10 as any of D1 and D2; $10 \times D1 + D2 - 11$; the calculation result is converted into a 10-bit binary number according to the decimal-to-binary conversion table; the last 7 bits is chosen as a result.

The operation of encoding the PHR and the last three digits of the user code specifically includes: D1, D2 and D3 represent a 3-digit decimal number and if any of D1, D2 and D3 is 0, then 0 will be replaced with 10 as any of D1, D2 and D3; $100 \times D1 + 10 \times D2 + D3 - 111$; the calculation result is converted into a binary number according to the decimal-to-binary conversion table.

The preferred embodiment of the present invention is described in details in the following.

Figure 1:
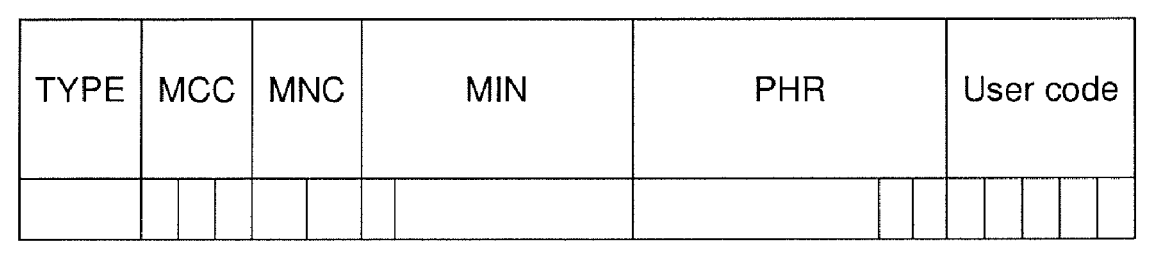

A method of encoding group identification in the CDMA trunking system according to the preferred embodiment of the present invention is described below in details: in a CDMA trunking service, each MS may belong to a specific trunking group, and each trunking group may have a specific GID. In this way, each trunking group may be identified through the GID. The GID consists of 16 digits (0-9). FIG. 1 is a schematic diagram of the method of encoding group identification in the CDMA trunking system according to the present invention. As shown in FIG. 1, the GID structure comprises: a TYPE (T), an MCC, an MNC, an MIN (XX), a PHR (H0H1H2) and a user code (ABCDE).

The T stands for the TYPE, identifies the GID type and consists of one digit. There are two GID types: one is solid type, in which the GID only contains 28 bits including the first bit for the TYPE; the other is dynamic type, in which the GID contains 52 bits including the first bit for the TYPE;

the MCC is a mobile country code and consists of three digits. The MCC of China is 86; the MNC is a mobile network code and consists of 2 digits;

the XX is a mobile identification number segment allocated to each country and consists of 2 digits;

the PHR H0H1H2 is allocated to a local network by an operator in a unified way and consists of three digits;

the user code ABCDE is a unique ID allocated by each PHR itself. Its range is 00000-99999. It consists of 5 digits.

In actual realization process, a 3-digit MCC may be encoded into a 10-bit binary number and the MS will memorize and save this 10-bit binary MCC; a 2-digit MNC and a 2-digit MIN are separately encoded into two 7-bit binary numbers, and the MS will memorize and save the 7-bit binary MNC and 7-bit binary MIN; a 8-digit GID_S consisting of 8 digits is encoded into a 27-bit binary number, and the MS will memorize and save this 27-bit binary GID_S.

The binary code of the GID_S may be defined as follows.

1. The first three digits of the GID_S are encoded into 10 significant binary bits at most through the following coding algorithm;

a. D1, D2 and D3 represent three digits, and Value 0 is replaced with 10;

b. Calculation: $100 \times D1 + 10 \times D2 + D3 - 111$;

c. Table 1 is a conversion table from decimal numbers to binary numbers. As shown in Table 1, the result at step b is converted according to the decimal-binary correspondence to obtain the first 3 bits of the GID_S that consists of 10 binary bits.

TABLE 1

| Decimal number | Binary number |
| --- | --- |
| 0 | 0000000000 |
| 1 | 0000000001 |
| 2 | 0000000010 |
| 3 | 0000000011 |
| 4 | 0000000100 |
| ... | ... |
| 998 | 1111100110 |
| 999 | 1111100111 |

2. The subsequent two digits are encoded into the 7 significant bits of the GID_S, which are used as the 7 bits in the middle of the 27-bit binary number;

The encoding method is described below:

a. D11 stands for the 11$^{th}$ digit and D12 for the 12$^{th}$ digit. If the value is 0, it will be replaced with 10;

b. Calculation: $10 \times D12 + D11 - 11$;

c. The result at the step b is converted into a 10-bit binary number according to the decimal-binary conversion described in Table 1, and the last 7 bits are chosen as a final result.

3. The last 3 digits are encoded into 10 significant bits of the GID_S. The encoding method is same as that at the step 1. They are used as the last 10 bits of the 27-bit binary number.

Table 2 shows a GID AI (Air Interface) encoding method, and specifically shows a 52-bit GID encoding solution:

TABLE 2

| Field name | Length (bit) |
| --- | --- |
| GID_TYPE | 1 |
| MCC | 10 |
| GID_11_12 (MNC) | 7 |
| GID_9_10 (MIN) | 7 |
| GID_S | 27 |

Table 3 shows a GID AI encoding method, and specifically shows a 28-bit GID encoding solution:

TABLE 3

| Field name | Length (bit) |
| --- | --- |
| GID_TYPE | 1 |
| GID_S | 27 |

Through the foregoing processing, the GID can be encoded by a preset encoding method.

On the basis of the above description, the application of the encoding method provided by the present invention will be described in details below by taking a paging match operation according to the encoding method of the present invention for example.

The concrete process of the paging match operation is described below:

A. a GID is determined and set pursuant to the encoding rule shown in FIG. 1.

B. a MS executes a GID matching operation in the paging process (as shown in FIG. 2a and FIG. 2b. FIG. 2a is a flow chart showing an MS conducts a paging match process by the encoding method provided by the present invention, and wherein the MS receives an MS addressing paging or broadcasting paging; FIG. 2b is a flow chart showing an MS conducts a paging match process by the encoding method provided by the present invention, and wherein the MS receives a broadcasting paging and channel assignment message).

Specifically, if the MS receives the MS addressing paging or broadcasting paging, then it will execute the MS paging match operation. If the MS receives in a paging channel a paging message for the MS addressing and the paging message contains an International Mobile Subscriber Identity (IMSI) (or called international code) or a Temporary Mobile Subscriber Identity (TMSI) allocated to the MS, then it will go ahead to execute step C. If the MS receives a general paging message that contains the GID, then it will go ahead to execute step D. If the MS receives a broadcasting paging and channel assignment message, then it will go ahead to execute step E.

C. With reference to FIG. 2a, the IMSI matching scheme in prior art is executed, and the MS sends a paging response message in an access channel.

Specifically, if the MS receives in a forward common control channel a paging message for addressing and the paging message contains the IMSI or TMSI allocated to the MS, then it will send a paging response message in reverse common signaling channel (r-csch).

If the MS is configured to receive broadcasting messages and has received a general paging message that contains a burst type and a broadcasting address which the MS has been configured to receive in the paging channel, then it will execute a broadcasting paging process.

If the MS is configured to receive broadcasting messages and has received a general paging message that contains a burst type and a broadcasting address which the MS has been configured to receive in a forward common control channel, it will execute an enhanced broadcasting paging process, and then go ahead to execute I.

D. With reference to FIG. 2a, the GID paging match operation of the MS is executed. If the MS receives in the paging channel a paging message for the GID addressing that is allocated to the MS, it will send a paging response message of a large group in the access channel, and then go ahead to execute step I.

E. With reference to FIG. 2b, the GID paging match operation of the MS is executed. If neither broadcasting address nor stored GID is same, then it will go ahead to execute step F; if the MS receives in the paging channel a broadcasting paging and channel assignment message for the GID addressing that is allocated to the MS, and this message is a resource-free broadcasting paging and channel assignment message, it will go ahead to execute step G; if this message is a resource-carried broadcasting paging and channel assignment message, then it will go ahead to execute step H.

F. The MS discards this broadcasting paging and channel assignment message, and then goes ahead to execute step I.

G. The MS sends a paging response message in the access channel, and then goes ahead to execute step I.

H. The MS directly enters a service state, and then goes ahead to execute step I.

I. End the matching process.

The following description is an example for the concrete realization of the encoding method provided by the embodiment of the present invention.

In the concrete realization process, for example, in the networking environment of Operator A, the encoding of some trunking group is as follows: solid-state encoding method is adopted, for instance, if the position T is 1, the MCC is 460, the MNC is 03, the XX is 01, and the H0H1H2 is allocated by the operator in a unified way, 122 for example, and the ABCDE is a unique ID allocated by the PHR, 12345 for example, and then the code of this GID will be: 1460030112212345.

As it is in solid state, the 28-bit GID encoding solution is adopted: the TYPE takes up 1 bit and the GID_S takes up 27 bits. The details are shown in Table 4. Table 4 shows the encoding based on the 28-bit GID encoding solution.

TABLE 4

| Field name | Length (bit) |
|---|---|
| GID_TYPE | 1 |
| GID_S | 27 |

Further, the embodiment may be realized through hardware, software, firmware, middleware, microcode, hardware description language or their combination. When it is realized through the use of software, firmware, middleware or microcode, the program codes or code segments used to execute necessary tasks may be stored in machine readable media such as storage media. (A plurality of) processors may execute necessary tasks. Code segments may express any combination of progress, functions, subprograms, programs, routine programs, sub-routine programs, modules, subjects, software packages, types, commands, data structures or program language. Through transporting and/or receiving information, data, independent variables or stored content, a code segment is coupled to another code segment or a hardware circuit. Information, independent variables, parameters and data may be transferred, transported or transmitted by any appropriate method such as: sharing of memory, message transfer, token transfer and network transport.

To summarize, by relying on the technical solution provided by the present invention, the GID encoding method is redefined and then the GID is encoded by the defined encoding method. This approach can make full use of the characteristics of different network segments and may guarantee the uniqueness and soundness of the GID, thereby solving the problem that the GID encoding method in related art is inapplicable to the developing CDMA trunking system and not easily managed, and further enabling an efficient group call and paging process.

The foregoing description is a preferred embodiment of the present invention and is not intended to limit the present invention. For those skilled in the art, the present invention may have various changes and modifications. All modifications, identical replacements and improvements made without departing from the principle of the present invention shall be within the protection scope of the present invention.

What is claimed is:

1. A method of encoding group identification in a CDMA trunking system, including the following steps:
a trunking group where mobile stations locate being encoded by a preset group identification (GID) encoding method to generate a GID of the trunking group;
the GID being a character string consisting of a plurality of decimal digits from 0 to 9 for external processing, and being processed into a binary character string according to a GID type for internal processing;
wherein when the GID is used for external processing, it is manifested in a form of a character string consisting of a 16-digit decimal number,
the GID comprises:
a type identity (TYPE), in the initial place of the GID, one digit, for identifying a GID type;
a Mobile Country Code (MCC), three digits, for identifying the country where the MS is located:
a Mobile Network Code (MNC), behind the MCC, two digits, for identifying the mobile network;
a Mobile Identification Number (MIN), behind the MNC, two digits, as a mobile identification number segment allocated to each country;
a Push to Talk (PTT) Home Register (PHR), behind the MIN, three digits, allocated to local network by an operator in a unified way; and
a user code, behind the PHR, five digits, as a sole identification number allocated by the PTT home register.

2. The encoding method of claim 1, wherein when the GID is used for internal processing, it is manifested in a form of a character string consisting of a 28-bit or 52-bit binary number.

3. The encoding method of claim 1, wherein the types of the GIDs include solid type and dynamic type.

4. The encoding method of claim 3, wherein, further comprising:
the type of the GID being judged according to the TYPE; and if the GID type is solid type, the GID will be processed into a 28-bit binary GID; if the GID type is dynamic type, the GID will be processed into a 52-bit binary GID.

5. The encoding method of claim 4, wherein the 28-bit binary GID comprises:
the TYPE, one bit; and
a 27-bit binary number obtained by encoding the PHR and the user code.

6. The encoding method of claim 5, wherein the 27-bit binary number obtained by encoding the PHR and the user code comprises:
a 10-bit binary number obtained by encoding the PHR, which takes up the first ten bits of the 27-bit binary number;
a 7-bit binary number obtained by encoding the first two digits of the user code, which takes up the seven bits in the middle of the 27-bit binary number; and
a 10-bit binary number obtained by encoding the last three digits of the user code, which takes up the last ten bits of the 27-bit binary number.

7. The encoding method of claim 6, wherein the process of encoding the PHR and the last three digits of the user code includes:
D1, D2 and D3 are used to represent a 3-digit decimal number and if any of D1, D2 and D3 is 0, then 0 will be replaced with 10 as any of D1, D2 and D3;
calculating 100×D1+10×D2+D3−111; and
the foregoing calculation result is converted into a 10-bit binary number according to a decimal-to-binary conversion table.

8. The encoding method of claim 6, wherein the process of encoding the first two digits of the user code to obtain a 7-bit binary number includes:
D1 and D2 are used to represent a 2-digit decimal number, and if any of D1 and D2 is 0, then 0 will be replaced with 10 as any of D1 and D2;
calculating 10×D1+D2−11;
the foregoing calculation result is converted into a 10-bit binary number according to a decimal-to-binary conversion table; and
the last 7 bits of the obtained 10-bit binary number is chosen as a result.

9. The encoding method of claim 4, wherein the 52-bit binary GID comprises:
the TYPE, one bit;
a 10-bit binary MCC obtained by encoding the MCC;
a 7-bit binary MNC obtained by encoding the MNC;
a 7-bit binary MIN obtained by encoding the MIN; and
a 27-bit binary number obtained by encoding the PHR and the user code.

10. The encoding method of claim 9, wherein the 27-bit binary number obtained by encoding the PHR and the user code comprises:
a 10-bit binary number obtained by encoding the PHR, which takes up the first ten bits of the 27-bit binary number;
a 7-bit binary number obtained by encoding the first two digits of the user code, which takes up the seven bits in the middle of the 27-bit binary number; and
a 10-bit binary number obtained by encoding the last three digits of the user code, which takes up the last ten bits of the 27-bit binary number.

11. The encoding method of claim 10, wherein the process of encoding the PHR and the last three digits of the user code includes:
D1, D2 and D3 are used to represent a 3-digit decimal number and if any of D1, D2 and D3 is 0, then 0 will be replaced with 10 as any of D1, D2 and D3;
calculating 100×D1+10×D2+D3−111; and
the foregoing calculation result is converted into a 10-bit binary number according to a decimal-to-binary conversion table.

12. The encoding method of claim 10, wherein the process of encoding the first two digits of the user code to obtain a 7-bit binary number includes:
D1 and D2 are used to represent a 2-digit decimal number, and if any of D1 and D2 is 0, then 0 will be replaced with 10 as any of D1 and D2;
calculating 10×D1+D2−11;
the foregoing calculation result is converted into a 10-bit binary number according to a decimal-to-binary conversion table; and
the last 7 bits of the obtained 10-bit binary number is chosen as a result.

* * * * *